P. D. & M. L. LANGAN.
LAMP FOR AUTOMOBILES.
APPLICATION FILED OCT. 16, 1917.
1,267,235.
Patented May 21, 1918.
2 SHEETS—SHEET 2.
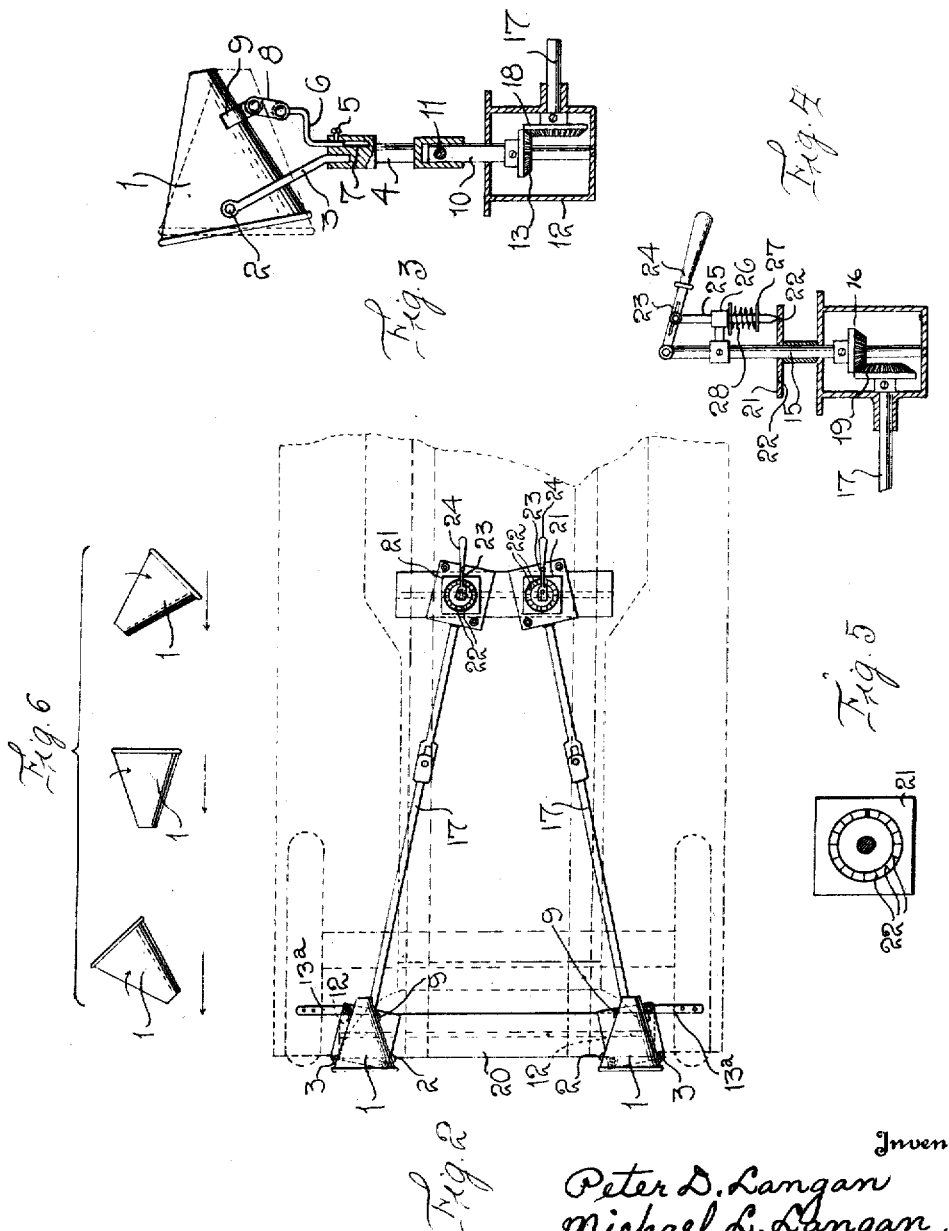
Inventors
Peter D. Langan
Michael L. Langan
By William D. Deane
Their Attorney

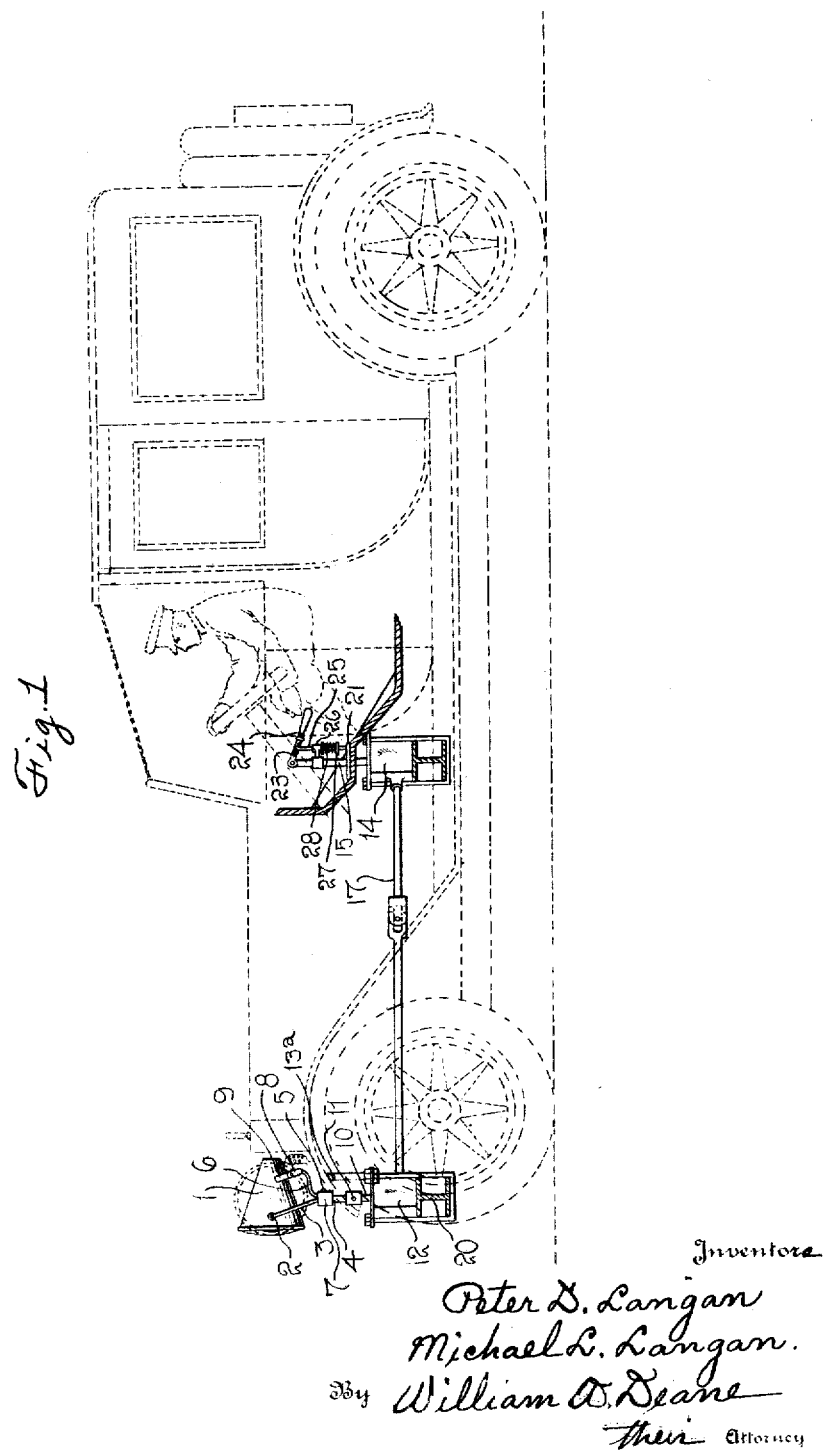

UNITED STATES PATENT OFFICE.

PETER D. LANGAN AND MICHAEL L. LANGAN, OF SCRANTON, PENNSYLVANIA.

LAMP FOR AUTOMOBILES.

1,267,235.  Specification of Letters Patent.  Patented May 21, 1918.

Application filed October 16, 1917. Serial No. 196,834.

*To all whom it may concern:*

Be it known that we, PETER D. LANGAN and MICHAEL L. LANGAN, citizens of the United States, residing at Scranton, in the county of Lackawanna and State of Pennsylvania, have invented certain new and useful Improvements in Lamps for Automobiles, of which the following is a specification.

Our present invention pertains to lamps for automobiles.

The general object of the invention is the provision in an automobile, of lamps at either side of the automobile on the front thereof, in combination with manually-operated means complementary to each lamp and through the medium of which the lamp may be manipulated independently of the other lamp. This will be appreciated as of material advantage when it is stated that with the means defined one lamp can be directed in one direction along a railroad track at a crossing and the other lamp can be directed in the opposite direction along the track, with the result that the locomotive engineer of a train or the motorman of an electric car approaching in either direction is put on notice that the automobile is on the track or is crossing the same. Also because of the independent mounting and manipulation of the lamps, either lamp on occasion may be converted into a "trouble light" to illuminate different parts of the automobile and enable the driver to inspect or repair or adjust the parts to advantage. Furthermore either or both of the lamps may be deflected upwardly or downwardly, to direct the light on the roadway or a particular part of the machine, horizontally or upwardly at an angle from the horizontal.

With the foregoing in mind the invention in all of its details will be fully understood from the following description and claims when the same are read in connection with the drawings, accompanying and forming part of this specification, in which:

Figure 1 is a view partly in elevation and partly in vertical section illustrating an automobile equipped with our improvement.

Fig. 2 is a view showing the improvement in plan.

Fig. 3 is an enlarged detail vertical section illustrative of one of the lamps and the mechanism appurtenant thereto.

Fig. 4 is an enlarged detail of the actuating mechanism complementary to one lamp.

Fig. 5 is a detail horizontal section showing the plate bearing the seats for the detent.

Fig. 6 comprises views showing the different positions in which each lamp may be placed.

Similar numerals of reference designate corresponding parts in all of the views of the drawings.

The lamps 1 *per se* may be of the ordinary construction or of any other suitable construction without affecting our invention.

Each lamp 1 is pivoted near its forward end at 2 between the arms of a bail 3 so as to be capable of swinging movement in a vertical plane. The bail 3 is suitably fixed at its lower end to a post 4. A lateral set screw 5 bears in the post 4 and is adapted to adjustably fix a vertically adjustable supporting rod 6 that is disposed and movable in a vertical socket 7 of the post. The upper portion of the rod 6 is bent rearwardly and upwardly, and the upper end of the rod is connected through a pivoted link 8 with a lug 9 on the under side of the rear portion of the lamp. From this it follows that when the set screw 5 is loosened the lamp 1 can be inclined longitudinally either upwardly or downwardly, the rod 6 following the movements of the lamp, and then when the lamp is positioned as desired the set screw 5 is tightened, whereupon, by reason of the set screw engaging the rod 6, the lamp will be adjustably fixed in position without liability of said position being casually shifted. The lower portion of the post 4, in the present and preferred embodiment of our invention, is tubular in form and is slipped over an upright shaft 10 and connected thereto through the medium of a diametrically-disposed pin 11 the ends of which are flush with the post. The shaft 10 bears in and is carried by a housing 12 and is provided within the housing with a miter gear 13. It will also be understood that on its outer side the housing 12 is equipped with a support for mud guard 13ᵃ.

At a suitable distance in rear of each housing 12 is a housing 14 in which bears and is carried a vertical shaft 15 on which is fixed within the casing a miter gear 16. Bearing in the opposite walls of the housings 12 and 14 is a longitudinal shaft 17 that is equipped within the housings with vertical miter gears 18 and 19 intermeshed with the miter gears 13 and 16, respectively.

In the present and preferred embodiment of our invention each housing 12 is secured to and carried by an I-beam 20 at the side of the machine chassis and the front of the machine. The shafts 17 extend into the rear housing 14 directly beneath the foot board of the machine; the housings 14 being suitably supported in the positions stated.

The shafts 15 extend upwardly through the foot board of the machine and are disposed at opposite sides of the machine within convenient reach of the driver.

Fixed to the foot board of the machine or otherwise suitably supported around the shafts 15 are plates 21 having circular series of seats 22, and suitably secured to the shafts 15 are handles 23. These handles 23 are provided at their upper ends with hand-grasp levers 24, disposed laterally thereto, and pivoted to and depending from said levers 24 are detent rods 25, adapted to enter the seats 22 with a view to adjustably fixing the lamps in the positions in which the same are placed. At 26 the rods 25 are guided in lateral sleeves fixed to and carried by the shafts 23, and at 27 said rods are provided with abutments between which and the lower ends of the sleeves 26 expansion springs 28 are interposed as shown. Said springs 28 operate to force the rods 25 downwardly and to yieldingly retain said rods in seats 22 so as to prevent casual rotation of the shafts 23 and the lamps 1 connected therewith. When, however, it is desired to turn either shaft 23 and the lamp 1 complementary thereto it is simply necessary for the driver to grasp and raise the proper lever 24, and then utilize the said lever in the turning of the shafts 23 and 15 and the lamp 1 connected therewith. Again when the lever 24 is released, the rod 25 connected thereto is immediately forced into one of the seats 22 and enabled to adjustably fix the shafts 23 and 15 and the lamp at that side of the machine.

Manifestly our novel lamp manipulating mechanisms and the lamps connected therewith are adapted to be turned through complete circles with the result that the range of usefulness thereof is considerably enlarged.

It will be gathered from the foregoing that our novel lamps and lamp-manipulating mechanisms are adapted to be actuated with the expenditure of little effort and that notwithstanding the utility of the mechanisms the same are simple and inexpensive in construction and are free of delicate parts such as are likely to get out of order after a short period of use. It will also be noted that our novel lamps and lamp-actuating mechanisms when properly made and embellished are calculated to enhance rather than detract from the finished appearance of an automobile.

We have entered into a detailed description of the construction and relative arrangement of the parts embraced in the present and preferred embodiment of our invention in order to impart a full, clear and exact understanding of the said embodiment. We do not desire, however, to be understood as confining ourselves to the said specific construction and relative arrangement of parts since in the future practice of the invention such changes or modifications may be made as fairly fall within the scope of our invention as claimed.

Having described our invention, what we claim and desire to secure by Letters Patent, is:

1. The combination of an automobile, a housing supported at one side of the front of the automobile, a housing secured under the foot board of the automobile at one side thereof, a longitudinal shaft extending between the first-named housing and the second-named housing and journaled therein, miter gears fixed on said shaft and disposed in said housings, upright shafts journaled in the housings and provided within the housings with miter gears intermeshed with the first-named miter gears; the rear shaft extending upwardly through the foot board, a lamp carried by and revoluble with the forward upright shaft, a plate secured on the foot board around the rear shaft and having a circular series of seats, a handle lever pivoted to and extending laterally from the rear shaft and adapted to be swung vertically thereon, and a spring-pressed detent rod held to the shaft and connected with and depending from the handle and adapted to enter the said seats.

2. The combination of an automobile, a housing supported at one side of the front of the automobile, a housing secured under the foot board of the automobile at one side thereof, a longitudinal shaft extending between the first-named housing and the second named housing and journaled therein, miter gears fixed on said shaft and disposed in said housings, upright shafts journaled in the housings and provided within the housings with miter gears intermeshed with the first-named miter gears; the rear shaft extending upwardly through the foot board, a lamp carried by and revoluble with the forward upright shaft, and a handle on the rear shaft.

3. The combination of an automobile, a forward upright shaft carried at one side of the front of the automobile, a lamp on said shaft, a rear upright shaft extending upwardly through the foot board of the automobile, a lateral vertically-movable handle on the upper portion of the latter shaft, a plate fixed on the foot board around said shaft and having a circular series of seats, a suitably guided, spring-pressed detent rod connected with and depending from the handle and adapted to enter said seats, and a connection between the rear shaft and the forward shaft for rotating the latter by the former; said connection being disposed under the foot board.

In testimony whereof we affix our signatures in presence of two witnesses.

PETER D. LANGAN,
MICHAEL L. LANGAN.

Witnesses:
AGNES M. LANGAN,
SADIE M. LANGAN.

Copies of this patent may be obtained for five cents each, by addressing the "Commissioner of Patents, Washington, D. C."